(12) United States Patent
Seo

(10) Patent No.: US 7,952,804 B2
(45) Date of Patent: May 31, 2011

(54) OPTICAL FILTER ELEMENT, OPTICAL FILTER, AND METHOD OF MANUFACTURING OPTICAL FILTER

(75) Inventor: Manabu Seo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 582 days.

(21) Appl. No.: 11/984,514

(22) Filed: Nov. 19, 2007

(65) Prior Publication Data
US 2008/0129936 A1 Jun. 5, 2008

(30) Foreign Application Priority Data
Nov. 21, 2006 (JP) ................................. 2006-314665

(51) Int. Cl.
*G02B 1/10* (2006.01)
(52) U.S. Cl. ......... 359/585; 359/587; 359/589; 359/590
(58) Field of Classification Search .................. 359/580, 359/584–590
See application file for complete search history.

(56) References Cited

U.S. PATENT DOCUMENTS

| | | | |
|---|---|---|---|
| 2004/0174475 A1* | 9/2004 | Lan et al. | 349/106 |
| 2007/0002414 A1* | 1/2007 | Stuck et al. | 359/15 |

FOREIGN PATENT DOCUMENTS

| | | |
|---|---|---|
| JP | 07-270613 | 10/1995 |
| JP | 2000-356768 | 12/2000 |
| JP | 2004-341506 | 12/2004 |
| JP | 2005-026567 | 1/2005 |

* cited by examiner

*Primary Examiner* — Joshua L Pritchett
(74) *Attorney, Agent, or Firm* — Dickstein Shapiro LLP

(57) ABSTRACT

There is disclosed an optical filter element that includes a translucent substrate; a laminated film formed by laminating plural thin films including a metal film on the translucent substrate; and a parallel structure in which parallel concave-shaped defective parts are periodically provided at a pitch shorter than a transmitted light wavelength. The parallel structure is formed in at least a part of the laminated film.

4 Claims, 19 Drawing Sheets

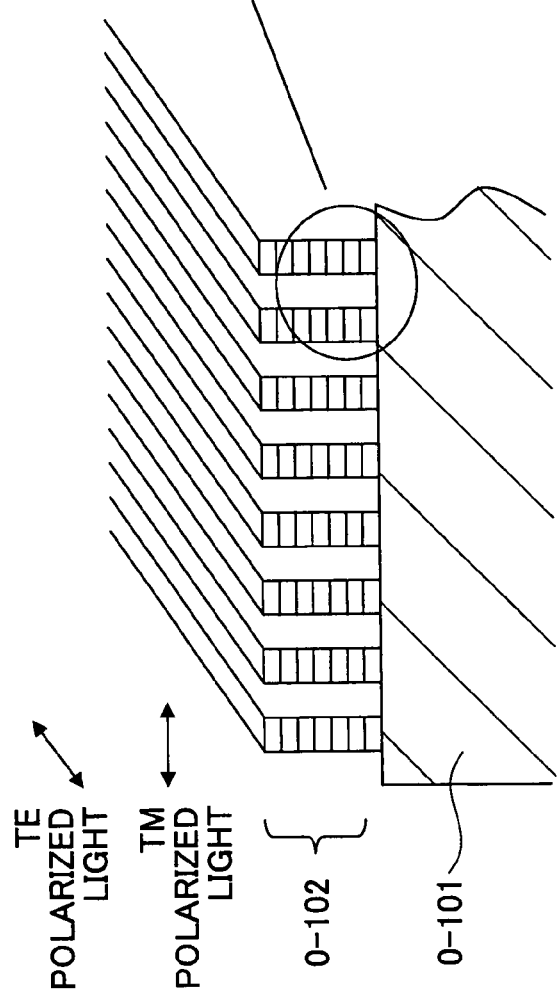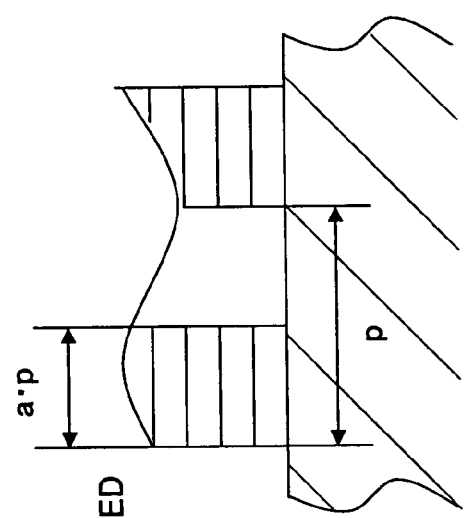

FIG.2

| LAYER | SUBSTANCE | THICKNESS(nm) |
|---|---|---|
| SURFACE MEDIUM | AIR | |
| 15 | Ta2O5 | 60 |
| 14 | SiO2 | 92 |
| 13 | Ta2O5 | 60 |
| 12 | SiO2 | 258 |
| 11 | Ta2O5 | 60 |
| 10 | SiO2 | 92 |
| 9 | Ta2O5 | 60 |
| 8 | SiO2 | 92 |
| 7 | Ta2O5 | 60 |
| 6 | SiO2 | 92 |
| 5 | Ta2O5 | 60 |
| 4 | SiO2 | 258 |
| 3 | Ta2O5 | 60 |
| 2 | SiO2 | 92 |
| 1 | Ta2O5 | 60 |
| SUBSTRATE | GLASS | |

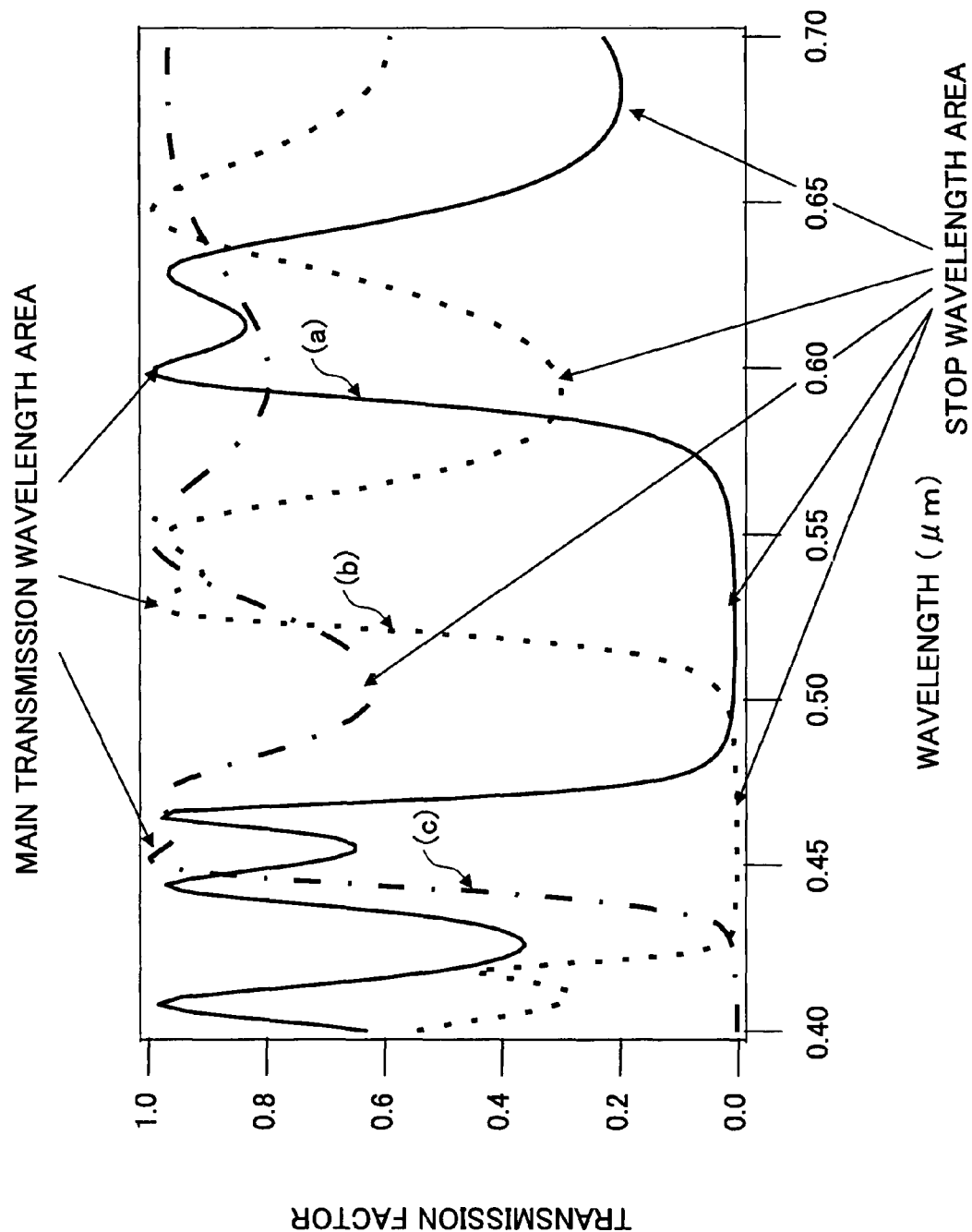

FIG.5

| LAYER | SUBSTANCE | THICKNESS (nm) |
|---|---|---|
| SURFACE MEDIUM | AIR | |
| 9 | SiO2 | 92 |
| 8 | Ta2O5 | 65 |
| 7 | SiO2 | 92 |
| 6 | Ta2O5 | 65 |
| 5 | SiO2 | 92 |
| 4 | Ta2O5 | 65 |
| 3 | SiO2 | 92 |
| 2 | Ta2O5 | 65 |
| 1 | Ag | 30 |
| SUBSTRATE | GLASS | |

Layers 3–9: 1-203
Layer 2: 1-202
Layer 1: 1-201

| | LAYER | SUBSTANCE | THICKNESS (nm) |
|---|---|---|---|
| 1-203 | SURFACE MEDIUM | AIR | |
| | 3 | Ag | 30 |
| 1-202 | 2 | Ta2O5 | 85 |
| | 1 | Ag | 30 |
| 1-201 | SUBSTRATE | GLASS | |

FIG.12

| LAYER | SUBSTANCE | THICKNESS(nm) |
|---|---|---|
| SURFACE MEDIUM | AIR | |
| 16 | SiO2 | 92 |
| 15 | Ta2O5 | 65 |
| 14 | SiO2 | 92 |
| 13 | Ta2O5 | 65 |
| 12 | SiO2 | 92 |
| 11 | Ta2O5 | 65 |
| 10 | SiO2 | 92 |
| 9 | Ta2O5 | 65 |
| 8 | Ag | 50 |
| 7 | Ta2O5 | 65 |
| 6 | SiO2 | 92 |
| 5 | Ta2O5 | 65 |
| 4 | SiO2 | 92 |
| 3 | Ta2O5 | 65 |
| 2 | SiO2 | 92 |
| 1 | Ta2O5 | 65 |
| SUBSTRATE | GLASS | |

Layers 10–16: 5-103
Layers 7–9: 5-102
Layers 1–6: 5-101

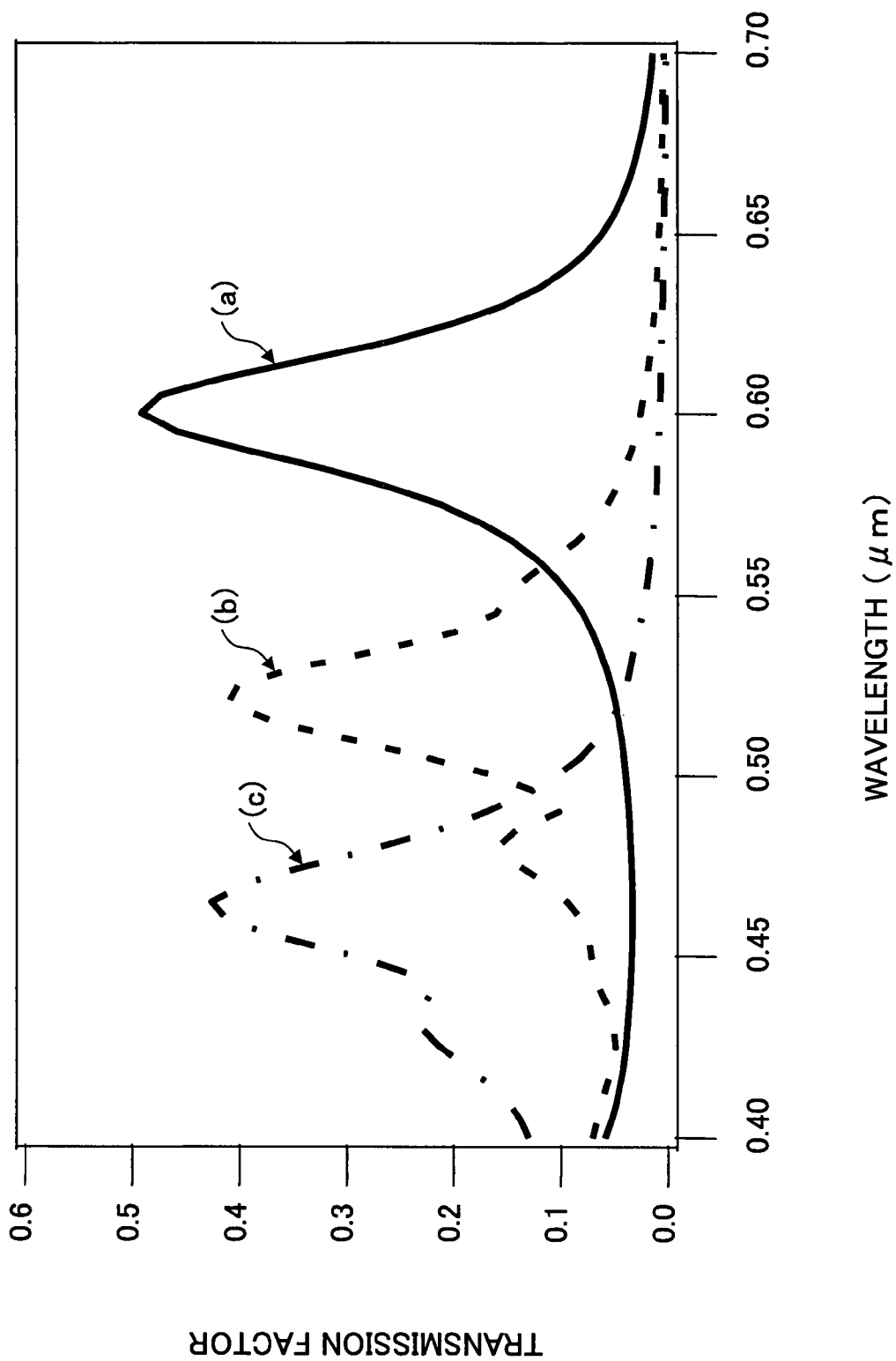

OPTICAL FILTER ELEMENT, OPTICAL FILTER, AND METHOD OF MANUFACTURING OPTICAL FILTER

BACKGROUND OF THE INVENTION

1. Field of the Invention

The present invention relates to an optical filter element, an optical filter, and a method of manufacturing the optical filter.

2. Description of the Related Art

Presently, color filters based on the three primary colors of red, green, and blue are used to pick up or display full color images in color image pick up devices such as electronic cameras and video cameras or color display devices such as liquid crystal displays and liquid crystal projectors. Specifically, they allow only the colors carried by pixels to pass through corresponding to the respective pixels of image pickup elements or liquid crystal elements and absorb the other color therein, to thereby pick up the images of the three colors of red, green, and blue. In order to obtain these color filters, pigments having strong absorption power at a specific wavelength are applied. However, the color filters having the pigments have problems in that the selectivity of transmission wavelength is poor, a transmission area is gently expanded due to a wide transmission wavelength area, and it is difficult to arbitrarily set a transmission wavelength area. Furthermore, since such color filters are generally weak against heat and disadvantageously absorb light of wavelengths outside the transmission wavelength area, they are not available under light having high intensity. In order to cope with the problems, there have been proposed a number of methods that use a filter composed of a laminated film, a dielectric multilayer film in which two types of nonmetal transparent materials each having a different refractive index are alternately laminated.

According to the invention as disclosed in Patent Document 1, for example, the dielectric multilayer film can provide various transmission spectral characteristics depending on the design of a film configuration, enhance the selectivity of transmission wavelength, and allow a transmission area to be narrowed.

Furthermore, the dielectric multilayer film has the characteristics of scarcely absorbing light and reflecting light of wavelengths outside a transmission wavelength area. With these characteristics, it can also be used not only as transmission-type but also as reflection-type color filters for liquid crystal display devices as described in the following Patent Documents. The invention as disclosed in Patent Document 2 provides a display device that forms three types of dielectric multilayer films having transmission wavelength corresponding to the three colors of R (red), G (green), and B (blue) for each liquid crystal pixel and produces color displays using the colors of RGB for the transmission-type color filter and those of C (cyan), M (magenta), and Y (yellow) for the reflection-type color filter.

In manufacturing color filters having a different transmission wavelength using the dielectric multilayer film as described above, it is necessary to change the configuration of the laminated film. Although the laminated films are formed by physical vapor deposition (PVD) method, chemical vapor deposition (CVD) method, or the like, they are separately formed to have a different configuration. In order to form color filters each having a different spectral characteristic for each area, it is necessary to bond such separately-formed laminated films together, which in turn causes low productivity and high costs. Particularly, it is very difficult to arrange such different laminated films in a fine area.

As opposed to this, there have been proposed optical filters having different spectral characteristics for each area, which can be manufactured by collective shape patterning. These optical filters eliminate separately forming the laminated films and use either a method of forming the laminated films after patterning shapes on a substrate or that of patterning the shapes on the substrate after forming the laminated films. Since such optical filters need only one step for manufacturing the laminated films, they can be excellent in productivity. According to Patent Document 3, for example, there has been proposed an invention related to a method of using a photonic crystal structure in which a fine periodic structure having different pitches is formed on a substrate and the laminated film is formed thereon. With this invention, it is possible to manufacture optical filters having different transmission wavelength areas by changing the pitch of the fine periodic structure formed on the substrate, namely, the lattice constant of photonic crystals.

Furthermore, Patent Document 4 discloses an optical filter having a structure in which fine cavities are formed in the laminated film. In this optical filter, the pitch of the cavities or the ratio thereof is different for each area, thereby creating a different transmission or reflection spectral characteristic to be expressed for each area. The optical filter of this type can shift a transmission wavelength area to a short wavelength side based on the ratio of the cavities.

Patent Document 1: JP-A-07-270613
Patent Document 2: JP-A-356768
Patent Document 3: JP-A-2004-341506
Patent Document 4: JP-A-2005-26567

As described above, there have been proposed the various optical filters. However, although the optical filter of Patent Document 3, for example, can shift a transmission wavelength area by changing the structure of crystals, it cannot increase the shift amount of the transmission wavelength area. Even optical filters of any transmission wavelength area could not increase the shift amount. For example, it is difficult to shift the transmission wavelength area up to those corresponding to the colors from red to blue only by changing the pitch of the fine periodic structure. Furthermore, the optical filter of Patent Document 4 has a problem in that a stop wavelength area also becomes narrowed as the ratio of the cavities increases. In other words, it is not easy to obtain a sharp transmission wavelength area with the optical filter. Furthermore, the optical filter does not provide sufficient selectivity of wavelength of transmitted light. Moreover, it is difficult to use the optical filter for light having a wide wavelength area such as visible light.

The present inventor has designed the optical filter (6) as shown in FIGS. 1A, 1B, and 2 based on the above inventions and studied its light transmission characteristics. FIGS. 1A and 1B are cross-sectional views schematically showing the structure of the optical filter (6), and FIG. 2 is a table showing the configuration of the laminated film of FIGS. 1A and 1B. The laminated film has a first layer and a second layer in this order from a translucent substrate. In FIG. 1A, a laminated film 0-102 is formed on the translucent substrate 0-101 with periodic gaps (concave parts) cut out in parallel with each other at an interval "p," and the width of a laminated structure part is represented by a×p. Here, "a" represents a duty ratio that is the ratio of a width in the laminated film structure relative to the interval (also referred to as pitch) "p." The duty ratio "a" is a value between 0 and 1. The duty ratio of 0 represents no laminated film structure and that of 1 represents a structure where no gaps are formed in the laminated film. The pitch "p" and the duty ratio "a" have the same meanings in the following description as well.

FIG. 3 shows the results obtained by calculating with rigorous coupled wave analysis (RCWA) a spectral transmission factor relative to the structure having the pitch "p" of 0.3 μm as shown in FIGS. 1A and 1B in the laminated film structure as shown in FIG. 2. In FIG. 3, the solid line (a), the dotted line (b), and the chain line (c) show spectral transmission factors where the duty ratio is 1, 0.5, and 0.2, respectively. Note, however, that they show the results of cases where light is perpendicularly incident on a filter and light (hereinafter referred to as TE polarized light) has an electric field vibration parallel with the periodic structure in its polarization direction. In the electric field directions of the TE polarized light and the TM polarized light orthogonal thereto, the TE polarized light is directed parallel with parallel grooves and the TM polarized light is directed perpendicular to the TE polarized light as indicated by the arrows in FIG. 1A.

As shown in FIG. 3, it is possible to change the light transmission characteristics by changing the duty ratio "a" of the periodic structure parts relative to the same laminated film structure. The smaller the duty ratio "a" is, the closer the main transmission wavelength area (hereinafter simply referred to as transmission band in some cases) as indicated by the arrows in FIG. 3 is shifted to the short wavelength side. Therefore, it is possible to easily manufacture an optical filter having different light transmission characteristics just by forming the same laminated film on the translucent substrate and changing the pitch of gaps and the duty ratio "a." As is clear from FIG. 3, however, if the duty ratio "a" is small, the reflectivity of light at a wavelength around a transmission band may be reduced, a stop wavelength area (hereinafter simply referred to as stop band in some cases) may be narrowed to degrade its stop function, and a light transmission area may even appear particularly on the long wavelength side. The width of the stop wavelength area and the strength of the stop function are based on a difference in refractive index of materials constituting the laminated film. Furthermore, if the laminated film has a fine structure like gaps, its refractive index will approximate an effective refractive index considering the influence by the fine structure. Since the effective refractive index becomes smaller as the duty ratio "a" of the fine structure gets smaller, the difference in the effective refractive index of two types of materials also becomes small in accordance with the duty ratio "a." Therefore, if the duty ratio "a" is small, the stop wavelength area will be narrowed and the stop function will be degraded.

In other words, the above things imply that it is difficult for such a structure to obtain filters including from one that allows only the color of red to pass through to another that allows only the color of blue to pass through with the same film configuration in attempting to manufacture optical transmission filters corresponding to the wavelength areas of the colors of red, green, and blue. There have not been proposed means for solving the problems. Therefore, with the above method, it is not possible to manufacture optical filter elements used in a wide wavelength area, particularly in the whole visible light area and light transmission filter elements that allow mainly only different wavelength areas such as the colors of red, green, and blue to pass through with location in the laminated film after forming the fine structure therein.

SUMMARY OF THE INVENTION

In view of the above problems, the present invention may provide an optical filter element that has high wavelength selectivity in a transmission wavelength area and is easily manufactured over a wide wavelength area, an optical filter, and a method of manufacturing the optical filter.

As a result of extensive study to solve the above problems, the present inventor has found that the problems may be solved by the following means and has thus made the present invention.

A preferred embodiment of the present invention provides an optical filter element comprising a translucent substrate; a laminated film formed by laminating plural thin films including a metal film on the translucent substrate; and a parallel structure in which parallel concave-shaped defective parts are periodically provided at a pitch shorter than a transmitted light wavelength. The parallel structure is formed in at least a part of the laminated film.

Preferably, an embodiment of the present invention provides the optical filter element further comprising a resonance structure in which the laminated film is laminated with an upper reflection layer, a spacer layer, and a lower reflection layer in this order. In this optical filter element, at least the spacer layer has the parallel structure in which the parallel concave-shaped defective parts are periodically provided at the pitch shorter than the transmitted light wavelength.

Preferably, an embodiment of the present invention provides the optical filter element, wherein at least either the upper reflection layer or the lower reflection layer has a laminated structure in which two or more types of nonmetal films each having a different refractive index are alternately laminated at equal pitches.

Preferably, an embodiment of the present invention provides the optical filter element, wherein the upper reflection layer and the lower reflection layer are metal films.

Preferably, an embodiment of the present invention provides the optical filter element, wherein the spacer layer is a nonmetal film, the lower reflection layer is a metal film, and the upper reflection layer and the spacer layer have the parallel structure in which the parallel concave-shaped defective parts are periodically provided at the pitch shorter than the transmitted light wavelength.

Preferably, an embodiment of the present invention provides the optical filter element, wherein a material having a dielectric constant smaller than that of the laminated film is supplied to fill in the defective parts of the parallel structure.

Preferably, an embodiment of the present invention provides the optical filter element, wherein the parallel concave-shaped defective parts in the parallel structure are oriented only in one direction.

Preferably, an embodiment of the present invention provides the optical filter element, wherein the parallel concave-shaped defective parts in the parallel structure are oriented in two or more directions and have isotropic polarization transmission characteristics.

An optical filter comprises a first optical filter element according to the embodiment of the present invention; and a second optical filter element that has the same laminated film as that of the first optical filter element on the translucent substrate common to the first optical filter element. The second optical filter element has a parallel structure which differs from the first optical filter element in at least either the pitch or a width of the defective parts.

An embodiment of the present invention provides the optical filter comprising a laminated film formed by laminating plural thin films including a metal film on a translucent substrate, a part of which optical filter has the optical filter element having the parallel structure.

Preferably, an embodiment of the present invention provides the optical filter, wherein an optical filter element having a metal thin film is formed on the translucent substrate.

Preferably, an embodiment of the present invention provides the optical filter in which the optical filter elements are periodically arranged.

Preferably, an embodiment of the present invention provides the optical filter, wherein three different types of optical filter elements are used, the elements having main transmission wavelength areas that represent colors of red, green, and blue, respectively.

An embodiment of the present invention provides a method of manufacturing an optical filter, comprising the steps of forming a laminated film formed by laminating plural thin films including a metal thin film on a translucent substrate; forming a parallel structure in which parallel concave-shaped defective parts are periodically provided in at least a part of the laminated film at a pitch shorter than a light wavelength; and shifting a main light transmission wavelength area of the parallel structure to that of an area in which the parallel structure is not formed.

Preferably, an embodiment of the present invention provides the method of manufacturing an optical filter, wherein parallel structure areas which differ at least either in the pitch or a width of the defective parts are formed.

BRIEF DESCRIPTION OF THE DRAWINGS

FIG. 1A is a structural schematic view of the optical filter (6);
FIG. 1B is a partial enlarged view of the optical filter (6);
FIG. 2 shows a laminated structure of the optical filter (6);
FIG. 3 shows light transmission characteristics of the optical filter (6);
FIG. 5 shows a laminated structure of the optical film (1);
FIG. 12 shows a laminated structure of the optical filter (4);
FIG. 15 shows light transmission characteristics of the optical filter (5)

DETAILED DESCRIPTION OF THE PREFERRED EMBODIMENTS

Figure 4B:
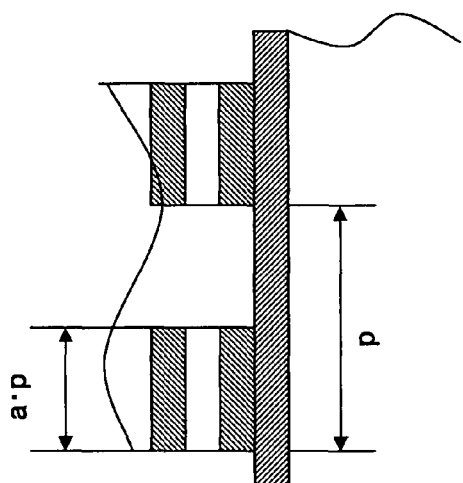
FIG. 4B is a partial enlarged view of the optical filter (1)
Figure 4A:
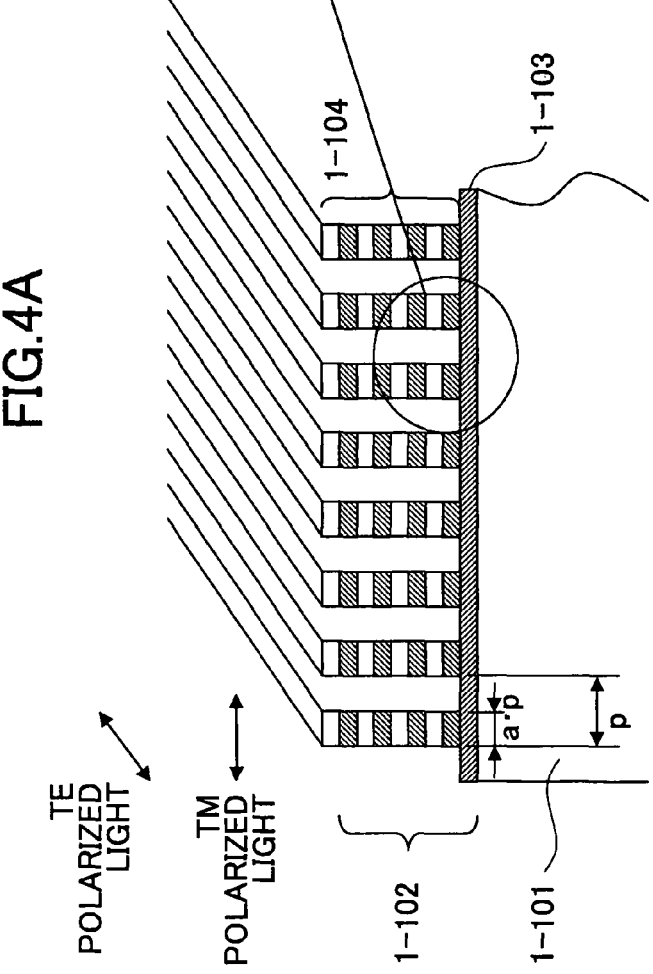
FIG. 4A is a structural schematic view of the optical filter (1)

The optical filter elements according to the embodiments of the present invention have a parallel structure in which parallel concave-shaped defective parts are periodically provided in at least a part of a laminated film formed by laminating plural thin films including a metal film on a translucent substrate at a pitch shorter than a transmitted light wavelength. The optical filter elements have the laminated film formed by laminating the plural thin films including the metal film on the surface of the translucent substrate made of such as glasses and optical plastics. As described below, the optical filter elements themselves may be used as a laminated body even at this stage. However, the optical filter elements according to the embodiments of the present invention have a parallel structure in which the parallel concave-shaped defective parts are periodically provided in at least a part of the laminated film formed on the surface of the translucent substrate at a pitch shorter than the transmitted light wavelength. For example, as shown in FIGS. 4A and 4B, parallel gaps are periodically provided in a part of the laminated film. With this parallel structure, it is possible to easily manufacture an optical filter whose light transmission characteristics are arbitrarily adjusted.

Although glasses are generally used as the translucent substrate, various materials such as compound semiconductors, metal oxides, and polymers may be used. As the translucent substrate, it is desired to use one having high transmission relative to the wavelength when used as an optical filter. Furthermore, although air is generally used as a surface medium, a substrate or the like having translucency may also be used. In this case, a laminated film having a fine structure is sandwiched between the substrates.

As the thin film for constituting the laminated film, any type may be permitted, provided that it meets light transmission characteristics, film durability, adhesion to the translucent substrate and other thick films, easiness in procuring and manufacturing, and the like. Examples include films composed of, e.g., silver, gold, platinum, copper, nickel, aluminum, or alloys thereof. Among them, desirable is one having high reflectivity and less absorbance in a wavelength area where the metal film is used as an optical filter element. For example, when the metal film is used in the whole visible light area, silver having high reflectivity in the whole visible light area and a small absorption coefficient is desirable.

A non-metal film is preferably a dielectric film and formed by laminating plural films each having a different refractive index. As the non-metal film, it may be similar to that of typical optical filter elements prepared by forming a thick film on a translucent substrate. For example, various glass materials, metal compounds, semiconductor materials, and polymers may be used. Particularly, glasses, metal oxides, metal nitrides, metal fluorides, or the like are preferable because they are thermally stable and have good physical strength and a high transmission factor. Furthermore, when the dry etching process as described below is included in manufacturing the optical filter elements, it is preferable to form a non-metal film layer by combining materials having approximately the same etching rate at the dry etching process together as laminated film materials.

Although the whole layer thickness of the laminated film is not particularly limited, it is based on the balance between the thickness and the number of required thin films and the concave-shaped defective parts. The whole layer thickness of the laminated film is generally preferably 100 through 800 nm. If the layer thickness is too small, the selectivity of transmitted light is likely to be reduced. If the layer thickness is too large, the laminated film is easily damaged, causing problems in its manufacturing and handling.

Although the thickness of the respective thin films greatly influences the light transmission characteristics as is the case with the material of the thin films, it is generally preferably about 10 through 400 nm. If the thickness is 100 nm or smaller, sufficient light transmission characteristics may not be obtained, or influences caused by an error in thickness may be increased at the manufacturing. If the thickness is 400 nm or larger, it becomes equal to a light wavelength, which in turn greatly influences the light transmission characteristics and makes it difficult to manufacture a desired optical filter.

The concave-shaped defective parts in the parallel structure are generally in the form of gaps formed by removing either a part or all of the laminated film with an etching process or the like. However, the concave-shaped defective parts may not be in the form of gaps. Alternatively, the laminated film may have defective parts in another form. For example, a material having a dielectric constant smaller than that of the laminated film may be supplied to fill in the defective parts. In this manner, it is possible to enhance the intensity of the laminated film. Note, however, that if the concave-shaped defective parts are in the form of gaps, it is easy to design the laminated film using the pitch of the defective parts and the duty ratio relative to a desired transmission wavelength because air has a small dielectric constant.

A suitable pitch "p" of the concave parts in the parallel structure may be 50 through 800 and preferably be 100 through 300 nm. If the pitch "p" is too small, a width relative to the layer thickness of the multilayer films sandwiched between the concave parts is formed too narrow, causing manufacturing difficulties. If the pitch "p" is too large, unnecessary light diffraction occurs, making it difficult to adjust the light transmission characteristics of optical filter elements. It is necessary to make the width of the concave parts shorter than the transmitted light wavelength to be used. As described above, the duty ratio "a" is a value between 0 and 1. Note that although optical filter elements having the duty ratio "a" of only 1 and 0 do not represent the optical filter elements according to the embodiments of the present invention, some of the optical filter herein may have such optical filter elements.

Figures 8, 9:
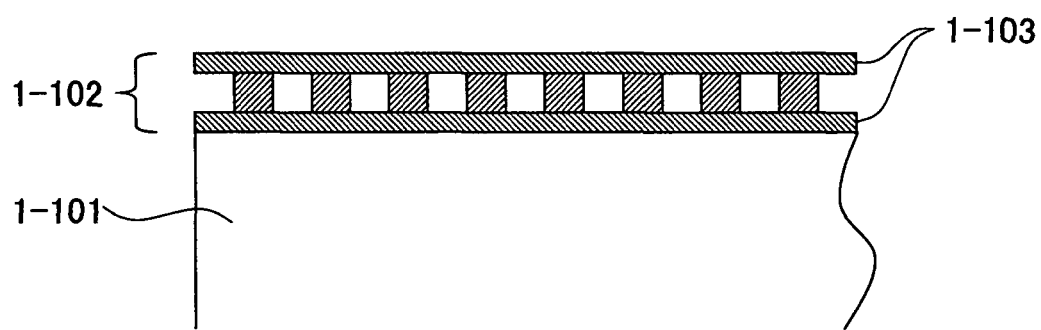
FIG. 8 shows a structural schematic view of the optical filter (3)
FIG. 9 shows a laminated structure of the optical filter (3)

As a preferred embodiment of the present invention, there is provided an optical filter element having a resonance structure in which the film is laminated with an upper reflection layer, a spacer layer, and a lower reflection layer in this order and at least the spacer layer has a parallel structure in which the parallel concave-shaped defective parts whose width is shorter than the transmitted light wavelength are periodically provided. For example, as shown in FIGS. 8 and 9, there is provided an optical filter element in which a tantalum pentoxide thin film, formed by laminating silver, tantalum pentoxide, and silver in this order on a glass substrate, constitutes the parallel structure where the parallel concave-shaped defective parts are periodically provided. Although only the spacer layer (tantalum pentoxide thin film) has the parallel structure in the example of FIG. 5, the silver thin film of either the upper reflection layer or the lower reflection layer may also have the parallel structure. Generally, if the parallel structure is formed in the upper reflection layer together with the spacer layer, its manufacturing process is also easy. The optical filter element having such a resonance structure makes it easy to control the light transmission characteristics with the duty ratio in the parallel structure. Furthermore, the optical filter element having various light transmission characteristics can be manufactured just with the polarization of the duty ratio.

More preferably, there is provided an optical filter element in which at least either the upper reflection layer or the lower reflection layer has a structure where two or more types of nonmetal films each having a different refractive index are alternately laminated at equal pitches. As an example, FIG. 8 shows the optical filter element having the structure as shown in FIGS. 4A, 4B, and 5 in which the two types of nonmetal films are alternately laminated as the upper reflection layer instead of the silver thin film. By making a part of the reflection layers a nonmetal film layer in this manner, it is possible to enhance the transmission factor of transmitted light.

Another preferable embodiment also includes an optical filter element in which the upper reflection layer and the lower reflection layer are metal films, and in particular, the lower reflection layer is a metal film. In other words, as a preferred embodiment of the present invention, FIGS. 4A and 4B show the optical filter element whose spacer layer is a nonmetal film and lower reflection layer is a metal film. In this optical filter element, the upper reflection layer and the spacer layer have a parallel structure in which the parallel concave-shaped defective parts whose width is shorter than a transmitted light wavelength are periodically provided. The metal thin film can efficiently stop light other than target transmitted light. The optical filter element whose lower reflection layer is a metal film is preferable in its manufacturing because it is easily etched at the time of forming the parallel structure in manufacturing processes.

Figure 20:
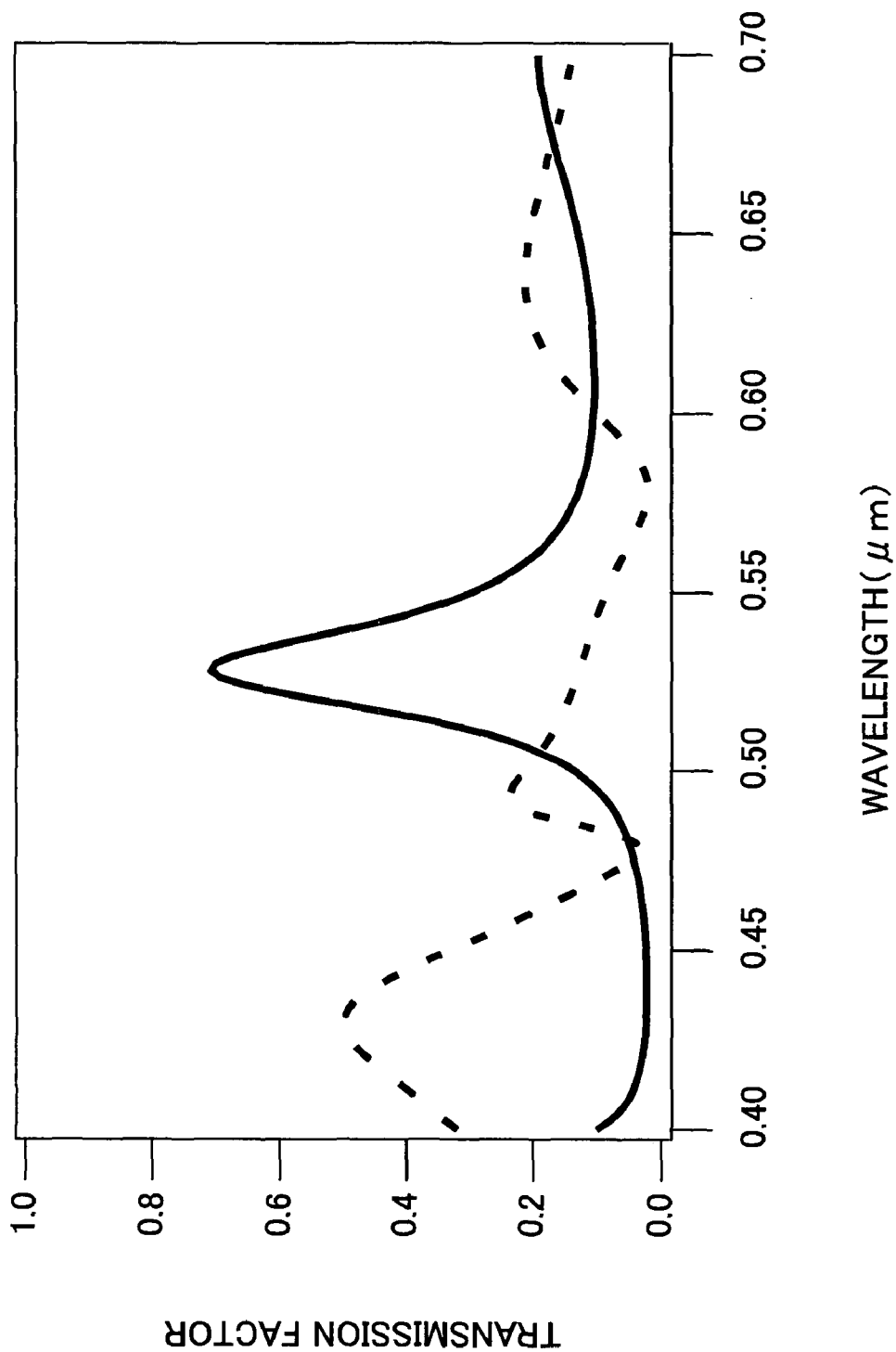
FIG. 20 shows spectral transmission factors of TE polarized light and TM polarized light.
Figure 21:
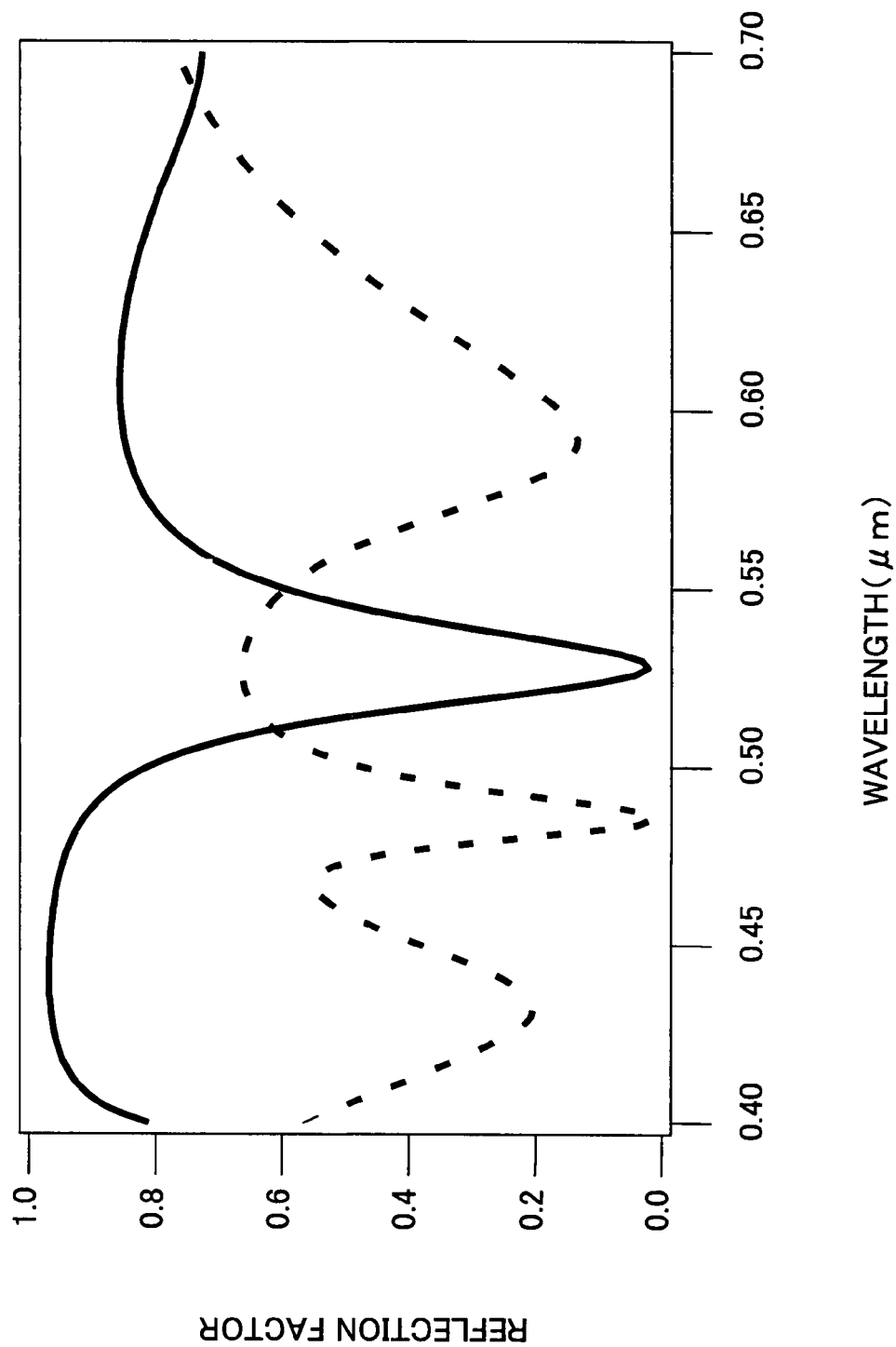
FIG. 21 shows spectral reflection factors of TE polarized light and TM polarized light.

The optical filter elements according to the embodiments of the present invention can be modified according to their usage. For example, when it is desired to handle polarized light or take out the polarized light as transmitted light, it is possible to use the optical filter element in which the parallel concave-shaped defective parts in the parallel structure are oriented only in one direction. As described above, where the parallel structure of the parallel concave-shaped defective parts is oriented only in one direction as shown in FIGS. 4A, 4B, 8, and the like, TE polarized light parallel with the parallel structure and TM polarized light perpendicular to the parallel structure have different spectral transmission characteristics and spectral reflection characteristics. For example, the spectral transmission factor and the spectral reflection factor of TE polarized light and TM polarized light where the pitch "p" is 0.3 μm and the duty ratio "a" is 0.4 are shown in FIGS. 20 and 21, respectively. In FIGS. 20 and 21, the solid lines show the spectral factors of the TE polarized light and the dotted lines show those of the TM polarized light. Since the TE polarized light and the TM polarized light have the different transmission characteristics in this manner, it is also possible to manufacture a distinctive optical element by using the polarization dependency. FIGS. 20 and 21 show an optical filter element that has a high transmission factor only at a specific wavelength area relative to the TE polarized light and has a low transmission factor in the whole wavelength area relative to the TM polarized light. Furthermore, when used only for light in a specific linear polarizing direction, the optical filter element having the parallel structure oriented in one direction is simpler in its structure and easier in its design and manufacturing than that having the parallel structure oriented in two or more directions as described below.

Figures 14A, 14B:
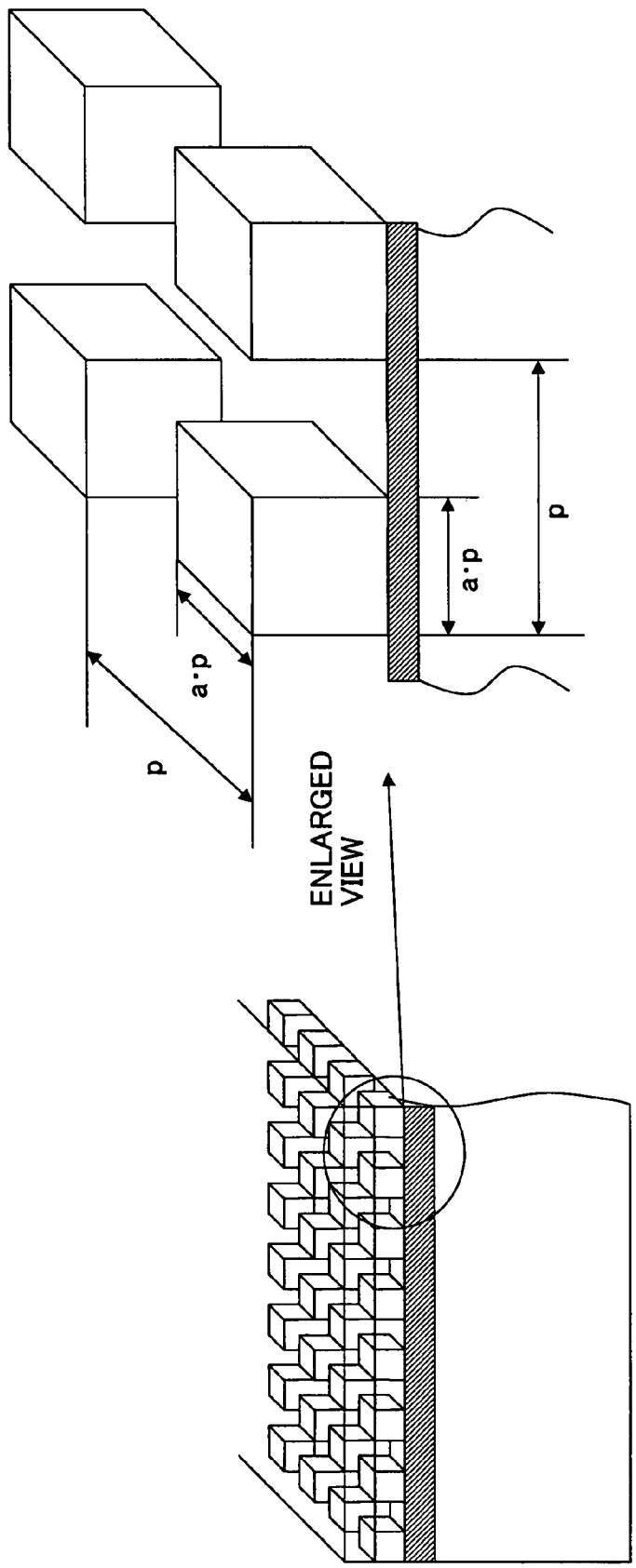
FIG. 14A is a structural schematic view of the optical filter (5)
FIG. 14B is a partial enlarged view of the optical filter (5)

On the other hand, when unpolarized light is handled, it is sometimes not preferable to use the optical filter element having the spectral transmission characteristics different for the TE polarized light and the TM polarized light. In this case, the parallel concave-shaped defective parts in the parallel structure of the optical filter element whose spectral transmission characteristics are not changed relative to polarized light are preferably oriented in two or more directions and have isotropic polarization transmission characteristics. For example, the optical filter element as shown in FIGS. 14A and 14B has the same parallel structures in two (vertical and horizontal) directions. In this case, the laminated film is left in the form of square-shaped quadrangular prisms as viewed from the top of the optical filter element. Therefore, the TE polarized light relative to one parallel structure serves as the TM polarized light relative to the other parallel structure. The same applies to the parallel structure perpendicular to these parallel structures. An optical filter element having the isotropic polarization transmission characteristics is thus obtained. Examples of the parallel structure having the isotropic polarization transmission characteristics include a structure in which the laminated film is left in the form of cylindrical columns instead of the quadrangular prisms; a structure in which the laminated film is left in the form of equilateral triangles as viewed from the top of the optical filter element, which are formed by individually tilting three types of parallel concave-shaped defective parts by 60 degrees; and a structure in which the laminated film is left in the form of equilateral hexagons to form the parallel concave-shaped defective parts.

The optical filter according to the embodiments of the present invention has plural optical filter elements, and it has at least the optical filter element according to the embodiments of the present invention, which differs at least either in the pitch or the width of the defective parts in the parallel structure. Moreover, the optical filter has preferably an optical filter element that is provided on the laminated film formed by laminating plural thin films including a metal film on the translucent substrate common to the optical filter element of the present invention and does not have the parallel structure. Such optical filters can be manufactured in the following manner. That is, the optical filter element is previously formed on the laminated film formed by laminating the plural thin films including the metal film on the translucent substrate. Then, the parallel structures having desired light transmission characteristics are formed in desired areas of the optical filter element. Accordingly, the optical filter is easily manufactured and suitable for mass production.

Furthermore, the optical filter preferably has an optical filter element formed just by laminating a metal thin film on the same translucent substrate. This optical filter element is not used for light transmission, but for light reflection. In other words, the optical filter element serves as a light shielding part in an optical filter that uses transmitted light. This optical filter is also easily manufactured and suitable for mass production.

The optical filter elements each having different types of light transmission characteristics in the above optical filter are preferably periodically arranged. For example, assume that there are three different types of optical filter elements whose main transmission wavelength areas represent the colors of red, green, and blue, respectively. If they are periodically arranged, the color filter allowing the light of the three primary colors of red, green, and blue to periodically pass through is obtained. If a reflection layer composed of a metal thin film is added thereto, a black filter can be added to the color filter.

Such an optical filter is manufactured in the following manner. First, a film formed by laminating plural thin films including a metal thin film is formed on the translucent substrate. Then, the parallel structure in which parallel concave-shaped defective parts whose width is smaller than a light wavelength are periodically provided in at least a part of the laminated film thus formed. In the optical filter, a main light transmission wavelength area is shifted according to the parallel structure to provide various light transmission wavelength areas. It is possible to change the light transmission wavelength area by controlling the pitch "p" and the duty ratio "a" of the parallel structure. If several types of such parallel structure areas are periodically formed on the translucent substrate laminated with the laminated film, it is also possible to easily manufacture an optical filter (color filter) having optical filter elements of the colors of red, green, and blue. Note that an optical filter element having a light transmission capability in a long wavelength area such as the color of red may be one having no parallel structure, i.e., having the duty ratio "a" of 1. Since the parallel structure formed in a part of the laminated film causes transmitted light to be shifted to the short wavelength side, it is possible to make optical filter element areas for transmitted light such as the colors of green and blue.

Next, a description is specifically made of the embodiments of the present invention.

Referring to FIGS. 4A, 4B, 5, and 6, a first embodiment of the present invention is described. FIGS. 4A and 4B schematically show the structure of an optical filter element according to the embodiments of the present invention. The optical filter element (1) is formed by laminating a laminated film 1-102 composed of a metal film 1-103 and a nonmetal laminated film 1-104 on a translucent substrate 1-101. The nonmetal laminated film 1-104 has gaps which form a parallel structure having periodic concave-shaped defective parts. Such a parallel structure having the concave-shaped defective parts is hereinafter simply referred to as a fine periodic structure. FIGS. 4A and 4B show a part of the optical filter element with the fine periodic structure having equal bottom parts and widths. However, the optical filters according to the embodiments of the present invention have plural optical filter elements like the one shown in FIGS. 4A and 4B on the same translucent substrate, which differ at least either in pitch or width. Here, the bottom part of FIG. 4A depicts a pitch (p) of the fine periodic structure and the width of the remaining part of the laminated film and is represented by a×p, where "a" represents a duty ratio showing the ratio of the width of the remaining laminated film part to the pitch "p." In the following description, the values of the pitch "p" and the duty ratio "a" are used for the sake of convenience. The duty ratio "a" can be a value between 0 and 1 where 0 represents an optical filter element having no laminated film structure and 1 represents an optical filter element having an ordinal laminated film structure in which no fine periodic structures composed of periodic concave-shaped defective parts are formed. In this manner, if the duty ratio "a" is changed, it refers to a range between the optical filter element having no laminated film structure and the optical filter element having no fine periodic structure.

The fine periodic structure need not be formed in the whole laminated film structure, but it may be formed in some part thereof. In FIGS. 4A and 4B, the fine periodic structure is not formed in the metal film 1-103, but it is formed in the other laminated films. If the fine periodic structure is formed at a pitch larger than an incident light wavelength when used as an optical filter element, it causes intense diffraction of light to occur. Therefore, the fine periodic structure needs to be formed at a pitch smaller than the shortest incident light wavelength when used as the optical filter element. FIG. 5 shows a design example of a specific film configuration of the laminated film 1-102. The film configuration as shown in FIG. 5 has a resonance structure and includes a lower reflection layer 1-201 composed of the metal film 1-103, a spacer layer 1-202 composed of a second layer film, and an upper reflection layer 1-203 composed of the third layer through the ninth layer. Here, the lower layer and the upper layer refer to the layer on the side near the substrate of the laminated film and that on the side far from the substrate, respectively, for the sake of convenience.

The layers from the third layer through the ninth layer constitute a so-called dielectric reflection layer in which two types of nonmetal materials each having a different refractive index are laminated at equal pitches and are formed by using $Ta_2O_5$ (having a refractive index of 2.183 at a wavelength of 550 nm) as a high refractive index material and $SiO_2$ (having a refractive index of 1.473 at a wavelength of 550 nm) as a low refractive index material.

Figure 6:
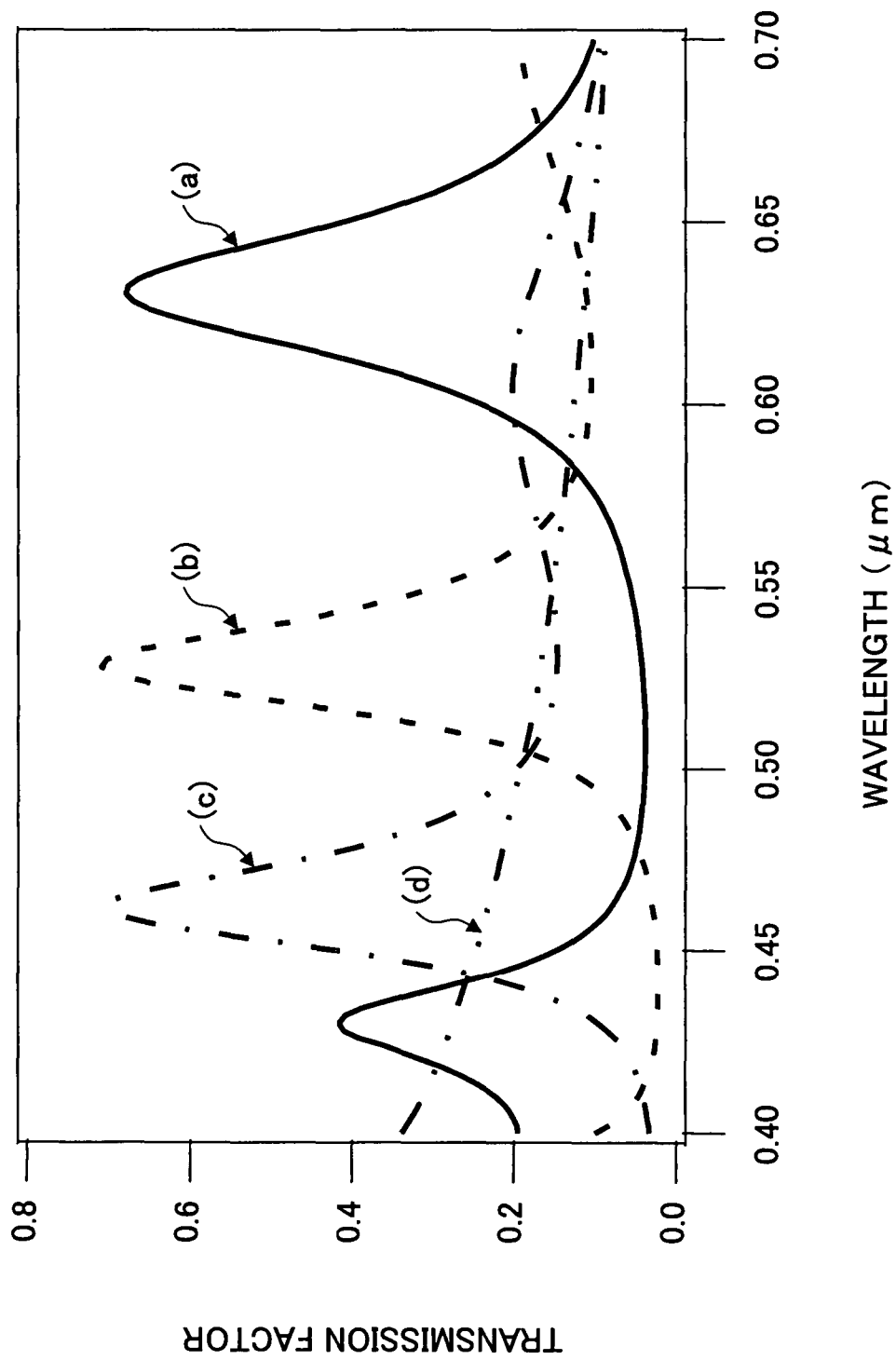
FIG. 6 shows light transmission characteristics of the optical filter (1)

FIG. 6 shows the results obtained by calculating with rigorous coupled wave analysis (hereinafter referred to as RCWA method) a spectral transmission factor relative to TE polarized light perpendicularly incident on the substrate in the optical filter element having the structure as shown in FIGS. 4A, 4B, and 5 where the pitch "p" is 0.3 µm. Here, a transmission factor of 1 refers to where all light is allowed to pass through, and a transmission factor of 0 refers to where there is no transmitted light. The TE polarized light is the same as the one defined according to FIGS. 1A and 1B and has its electric field directions parallel with the directions of the parallel structure. In FIG. 6, the solid line (a), the dotted line (b), the chain line (c), and the two-dot chain line (d) show spectral transmission factors where the duty ratio "a" is 1, 0.4, 0.2, and 0, respectively. The wavelength areas of light corresponding to the colors of blue, green, and red fall within the ranges of about 450 nm to 500 nm, 500 nm to 550 nm, and 600 nm to 700 nm, respectively. Therefore, if the duty ratio "a" is 1, i.e., if the laminated film has no fine periodic structure, the optical filter element allowing almost only the color of red to pass through (hereinafter referred to as red transmission optical filter element) is provided. If the duty ratio "a" is 0.4, the optical filter element allowing only the color of green to pass through (hereinafter referred to as green transmission optical filter element) is provided. If the duty ratio "a" is 0.2, the optical filter element allowing only the color of blue to pass through (hereinafter referred to as blue transmission optical filter element) is provided. With such optical filter elements having the resonance structure as the laminated film structure as shown in FIG. 5, it is possible to provide a bandpass filter having a high transmission band only at a specific wavelength area. Furthermore, if the fine periodic structure is formed in at least a part of the laminated film structure, the transmission band is changed according to the duty ratio "a" of the fine periodic structure. Moreover, since metals have generally a high transmission factor in a wide wavelength area, the configuration using the metal film layer as shown in FIGS. 4A, 4B, and 5 makes it possible to keep a stop band wide even if the duty ratio "a" is small and to reduce the transmission factor with a wavelength other than the transmission band. Furthermore, it is possible to manufacture the above optical filter element having high selectivity of transmitted light by using fewer layers in number than the laminated film structure composed only of nonmetal materials as shown in FIG. 2. Moreover, the laminated film structure including a metal film is easily operated on in an etching process or the like.

Furthermore, if the duty ratio "a" is 0, i.e., if only the metal film 1-103 as the lower reflection layer is formed in the laminated film so as to reflect light, a low transmission factor is caused to be applied over the whole wavelength area of visible light to thereby form a black color. The optical filter may include an area having a duty ratio of 0.

Figure 7:
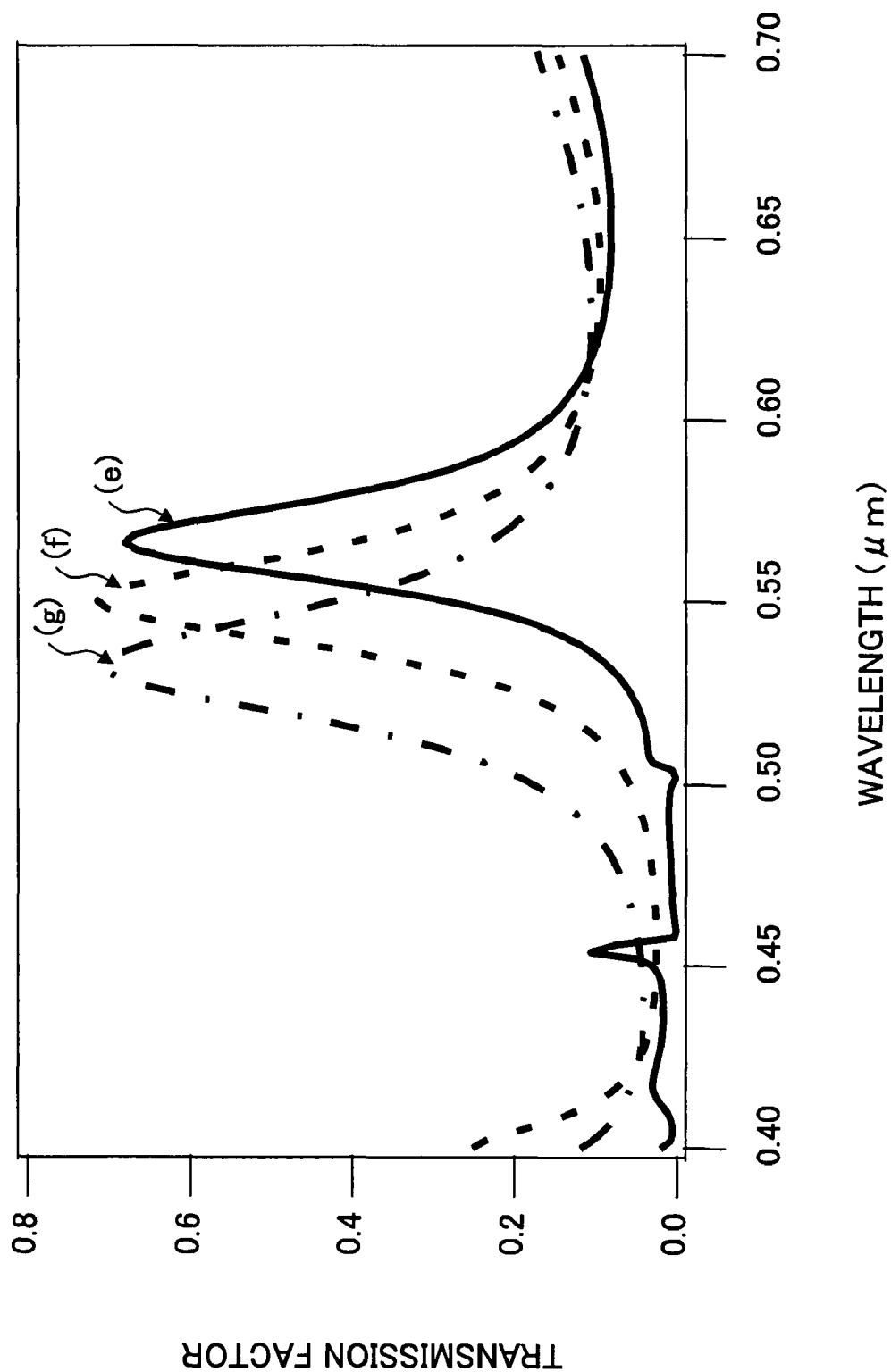
FIG. 7 shows light transmission characteristics of the optical filter (2)

Referring to FIGS. 4A, 4B, 5, and 7, a description is now made of a second embodiment of the present invention. FIG. 6 shows the spectral transmission characteristics when the duty ratio "a" is changed. However, it is also possible to change the spectral transmission characteristics by changing the pitch "p." FIG. 7 shows' the spectral transmission characteristics if the duty ratio "a" is the constant value of 0.5 and the pitch "p" is changed in the structure as shown in FIGS. 4A, 4B, and 5. In FIG. 7, the solid line (e), the dotted line (f), and the chain line (g) show spectral transmission factors when the pitch "p" is 0.4 µm, 0.3 µm, and 0.2 µm, respectively. In this manner, even where the pitch "p" of the fine periodic structure is made small, the wavelength band of transmitted light is shifted to the short wavelength side. However, the amount of change in the transmission band by changing the pitch "p" is smaller than that by changing the duty ratio "a." Therefore, if it is desired to change the transmission band in a wide area, it is more preferable to use the fine periodic structure in which the duty ratio "a" is changed. Furthermore, if there is provided a structure which differs both in the pitch "p" and in the duty ratio "a" according to an area, it is possible to change the wavelength band of transmitted light more widely and makes it easy to optimize the wavelength band of the transmitted light. Furthermore, it is not necessary for all the laminated films to have the same pitch "p" and the duty ratio "a." The pitches "p" and the duty ratios "a" may be different from one another for each layer.

As described above, it is possible to provide an optical filter having a different wavelength band of transmitted light for each area by forming, in the laminated film structure including the metal film, the fine periodic structure which differs in either one or both the duty ratio "a" and the pitch "p" according to an area.

Figure 10:
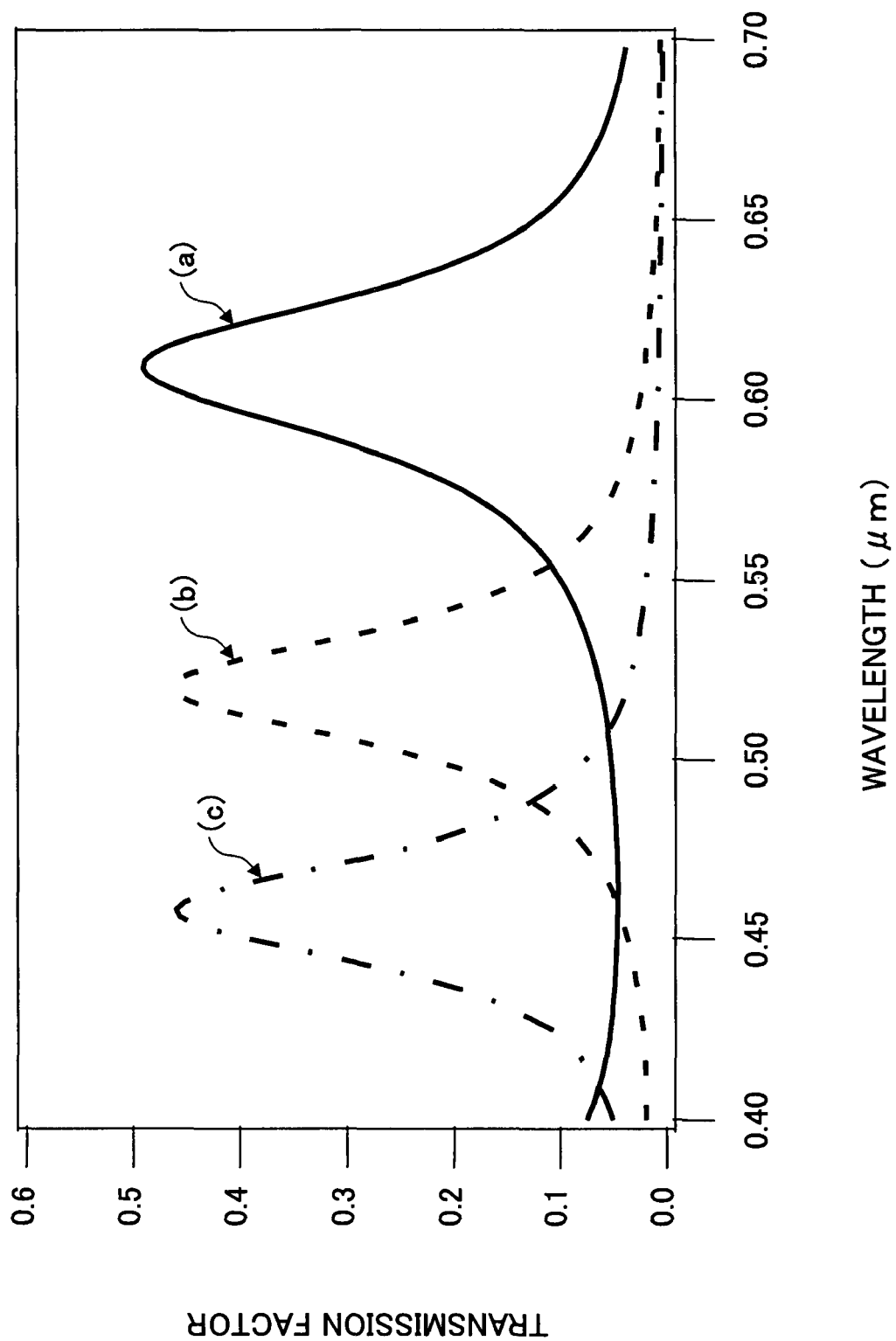
FIG. 10 shows light transmission characteristics of the optical filter (3)

Referring to FIGS. 8, 9, and 10, a third embodiment of the present invention is described.

The optical filter element (3) as shown in FIGS. 8 and 9 has the metal film 1-103 in both the upper reflection layer and the lower reflection layer of the laminated film. FIG. 8 schematically shows a structural cross-sectional view of the optical filter element, and FIG. 9 shows the configuration of the laminated film. In the laminated film, a first layer and a third layer correspond to the lower reflection layer 1-201 and the upper reflection layer 1-203, respectively, and a second layer corresponds to the spacer layer 1-202. Furthermore, the gaps as shown in FIGS. 4A and 4B are formed to provide the fine periodic structure only in the second layer of a $Ta_2O_5$ layer as the spacer layer.

FIG. 10 shows the results obtained by calculating with the RCWA method a spectral transmission factor relative to TE polarized light perpendicularly incident on the translucent substrate in the optical filter element having the structure as shown in FIGS. 8 and 9 where the pitch "p" is 0.3 µm. In FIG. 10, the solid line (a), the dotted line (b), and the chain line (c) show the spectral transmission factors where the duty ratio "a" is 1, 0.4, and 0.2, respectively. As in the case of FIG. 6, if the duty ratio "a" is 1, 0.4, and 0.2, there is provided a structure in which the optical filter element serves as a red transmission optical filter element, a green transmission optical filter element, and a blue transmission optical filter element, respectively.

As shown in FIG. 10, the light transmission factor is kept low in the stop band of light transmission compared with that as shown in FIG. 6. However, the transmission factor in the transmission band is lower than that as shown in FIG. 6. This is possibly because the upper reflection layer uses a single layer of metal instead of the laminated structure in which two types of nonmetal metal materials are alternately laminated at equal pitches. The use of the metal layer as the upper reflection layer makes it possible to keep the transmission factor low relative to the stop band. However, the transmission factor is lowered in the transmission band due to light absorption by the metal itself. Accordingly, it is preferable to decide which one to use for the reflection layer according to the specification when the optical filter element is to be used.

Furthermore, since the optical filter element is required to have the performance both in the light transmission band and the stop band in many cases, it is preferable to use the structure of the laminated film in which the metal layer is used for the reflection layer on one side and two types of nonmetal materials are alternately laminated at equal pitches for the reflection layer on the other side. When it is necessary to further lower the transmission factor in the stop band with the optical filter element, a pigment having a different wavelength characteristic of absorbance may be applied to each area.

Figure 11:
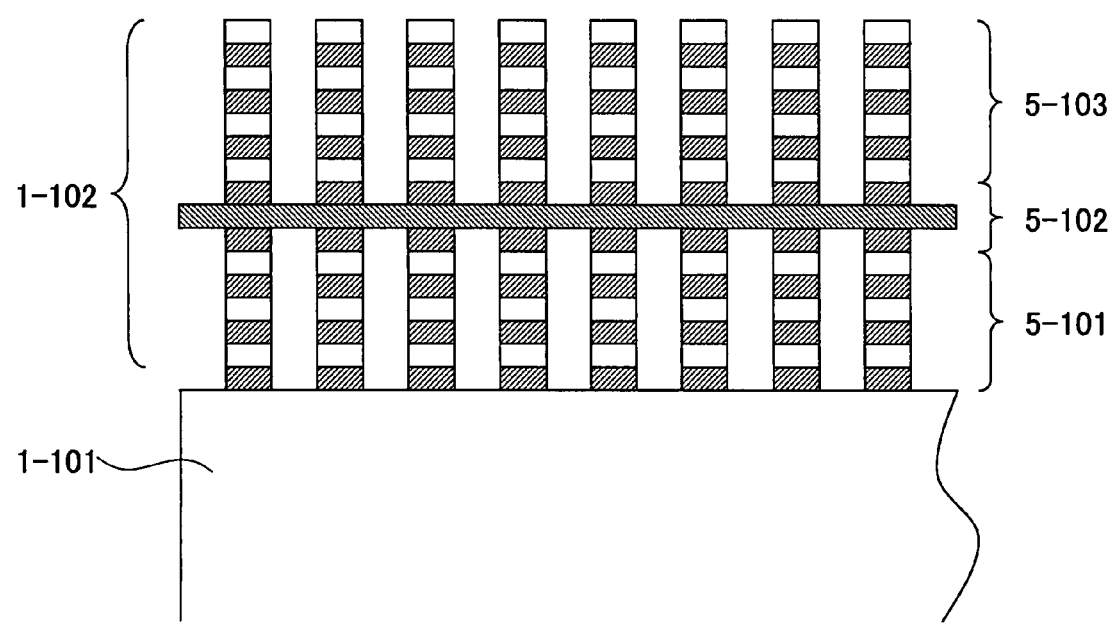
FIG. 11 is a structural schematic view of the optical filter (4)

As a fourth embodiment of the present invention, there is provided an optical filter element (4) having a structure in which a metal film is used for the spacer layer in the laminated film structure as shown in FIGS. 11 and 12. FIG. 11 schematically shows a structural cross-sectional view of the optical filter element of this embodiment, and FIG. 12 shows the configuration of the laminated film. The laminated film is composed of a lower reflection layer 5-101 in which $Ta_2O_5$ and $SiO_2$ are laminated at equal pitches, an upper reflection layer 5-103 in which $Ta_2O_5$ and $SiO_2$ are laminated at equal pitches, and a spacer layer 5-102 that is arranged between the lower reflection layer 5-101 and the upper reflection layer 5-103 and includes a metal film. The gaps as shown in FIGS. 4A and 4B are formed in the lower reflection layer 5-101 and the upper reflection layer 5-103 to thereby provide the fine periodic structures.

Figure 13:
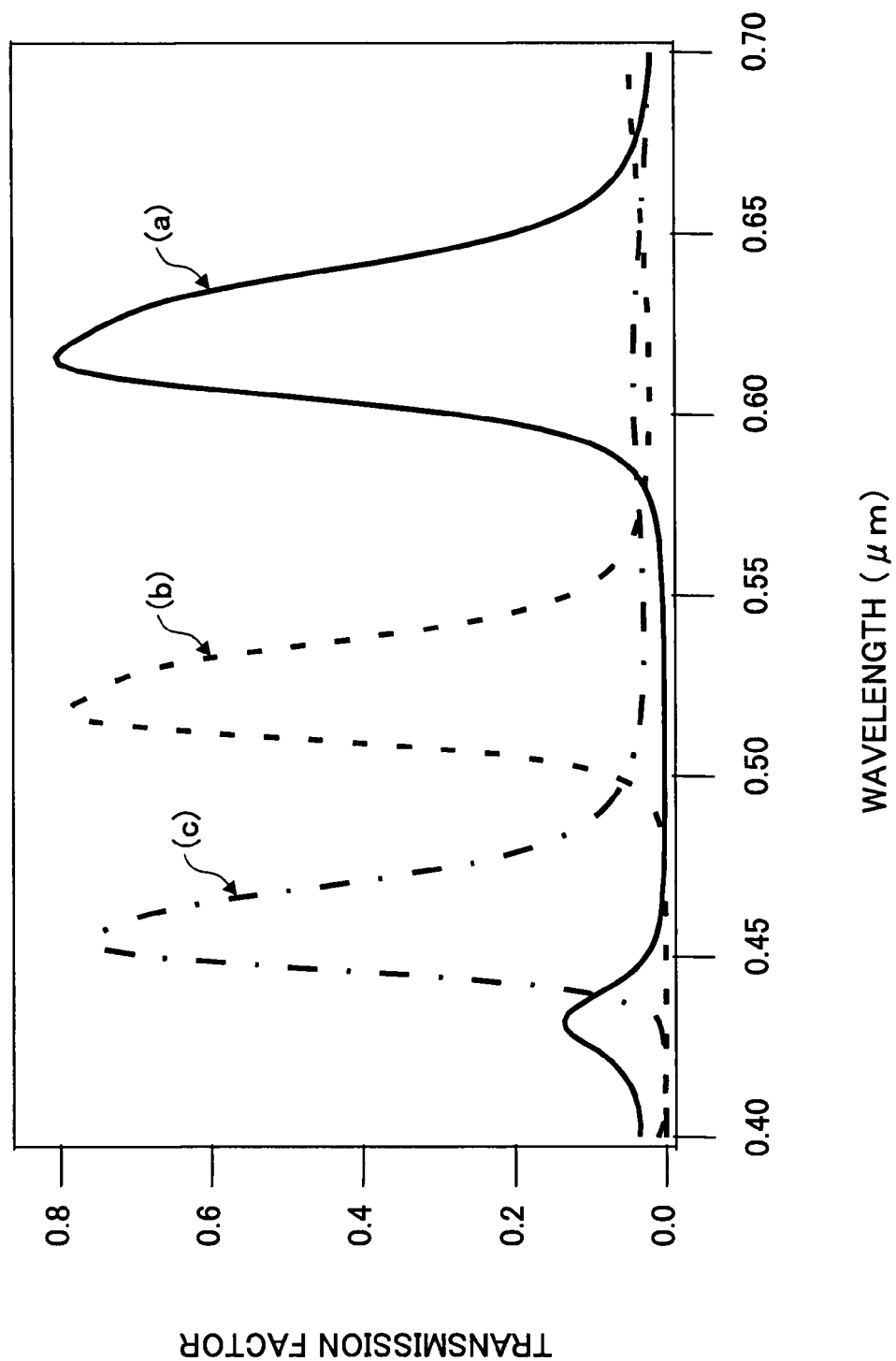
FIG. 13 shows light transmission characteristics of the optical filter (4)

FIG. 13 shows the results obtained by calculating with the RCWA method a spectral transmission factor relative to TE polarized light perpendicularly incident on the translucent substrate in the optical filter element (4) having the structure in which the pitch "p" is 0.4 µm. In FIG. 13, the solid line (a), the dotted line (b), and the chain line (c) show the spectral transmission factors where the duty ratio "a" is 1, 0.4, and 0.2, respectively. As in the case of FIG. 6, if the duty ratio "a" is 1, 0.4, and 0.2, there is provided a structure in which the optical filter element serves as the red transmission optical filter element, the green transmission optical filter element, and the blue transmission optical filter element, respectively. As described above, even where the metal layer is used for the spacer layer, but not for the reflection layers, it is possible to provide the optical filter element having a wide stop band like the optical filter element (3).

Next, a fifth embodiment of the present invention is described. In the above embodiments, there are provided the optical filter elements in which the gaps are periodically formed in the laminated film as the fine periodic structure. However, other materials may be supplied to fill in the gaps. The structure having other materials instead of the gaps is advantageous in that it is mechanically stable. However, if the materials filling in the gaps have a high dielectric constant, a change in transmission center wavelength band becomes small to thereby make it difficult to form an optical filter element for multiple transmission wavelength bands, even if either one or both of the duty ratio and the pitch in the fine periodic structure is/are changed. The change capability in transmission center wavelength band is the largest where the fine periodic structure is formed by the gaps (having a dielectric constant of nearly zero) and the laminated film materials. In general, the fine periodic structure is preferably in the form of gaps.

Next, a sixth embodiment of the present invention is described. The optical filter elements of the above embodiments have the periodic structure oriented in one direction as the fine periodic structure. Since such a fine periodic structure oriented in one direction induces polarization anisotropy called structural birefringence, the optical filter elements of the embodiments have a different transmission or reflection spectral characteristic depending on the polarization direction. If a different spectral characteristic for each polarization direction is desired, it is possible to use such a one-dimensionally oriented fine periodic structure in which the polarization direction of light passing through liquid crystal elements is limited to a specific linear polarization, for example, like a case where the optical filter element is used for a display device using liquid crystals. For such an application, the above optical filter elements easily manufactured and simple in structure are suitable.

However, when the polarization anisotropy as described above is not desired for an optical filter element, it is preferable to use a periodic structure that has optical isotropy on the surface of the optical filter element, i.e., the optical filter element preferably has a periodic structure which spreads two-dimensionally, not one-dimensionally as the fine periodic structure. FIGS. 14A and 14B show an embodiment example of the laminated film structure of the present invention where the fine periodic structures having the two-dimensional spread are formed. FIGS. 14A and 14B show the optical filter element (5) having a structure in which quadrangular prisms having a square-shaped horizontal cross-section are periodically formed in two directions as the fine periodic structure having the two-dimensional spread. In this case, as shown in FIG. 14B, the pitch "p" and the duty ratio "a" are represented by a pitch as viewed from one direction and a ratio of the width of the laminated film to the pitch as viewed from the same one direction. Note that since the optical filter element (5) has planar isotropy, the pitch "p" and the duty ratio "a" as viewed from the other direction have the same values. The fine periodic structure may be formed by arranging cylindrical columns. Alternatively, the gaps of the fine periodic structure may be in the form of cylindrical columns or quadrangular prisms. In addition, as the fine periodic structure, a triangular prism having an equilateral triangle-shaped horizontal cross-section or a hexagonal column having an equilateral hexagonal-shaped horizontal cross section may be used. The optical filter element (5) of this type can be used as an optical filter element having no polarization anisotropy.

The configuration of the laminated film of the optical filter element (5) is the same as that as shown in FIG. 9: an Ag layer is used for the lower reflection layer and the upper reflection layer and $Ta_2O_5$ is used for the spacer layer. The fine periodic structure is formed only in the $Ta_2O_5$ layer as the spacer layer. Note that the upper reflection layer is made transparent in FIGS. 14A and 14B in consideration of the easiness to see. FIG. 15 shows the results obtained by calculating with the RCWA method a spectral transmission factor relative to light perpendicularly incident on the translucent substrate in the optical filter element (5). In FIG. 15, the solid line (a), the dotted line (b), and the chain line (c) show spectral transmission factors where the duty ratio "a" is 1, 0.7, and 0.4, respectively. In this case, the spectral transmission factors relative to TE polarized light and TM polarized light are completely the same.

For example, as a color filter used for an image pick-up element, it is preferable to use one having the two-dimensional spread and the isotropic polarization transmission characteristics as the fine periodic structure constituting the embodiments of the present invention, because non-polarized light enters the color filter.

Figure 16:
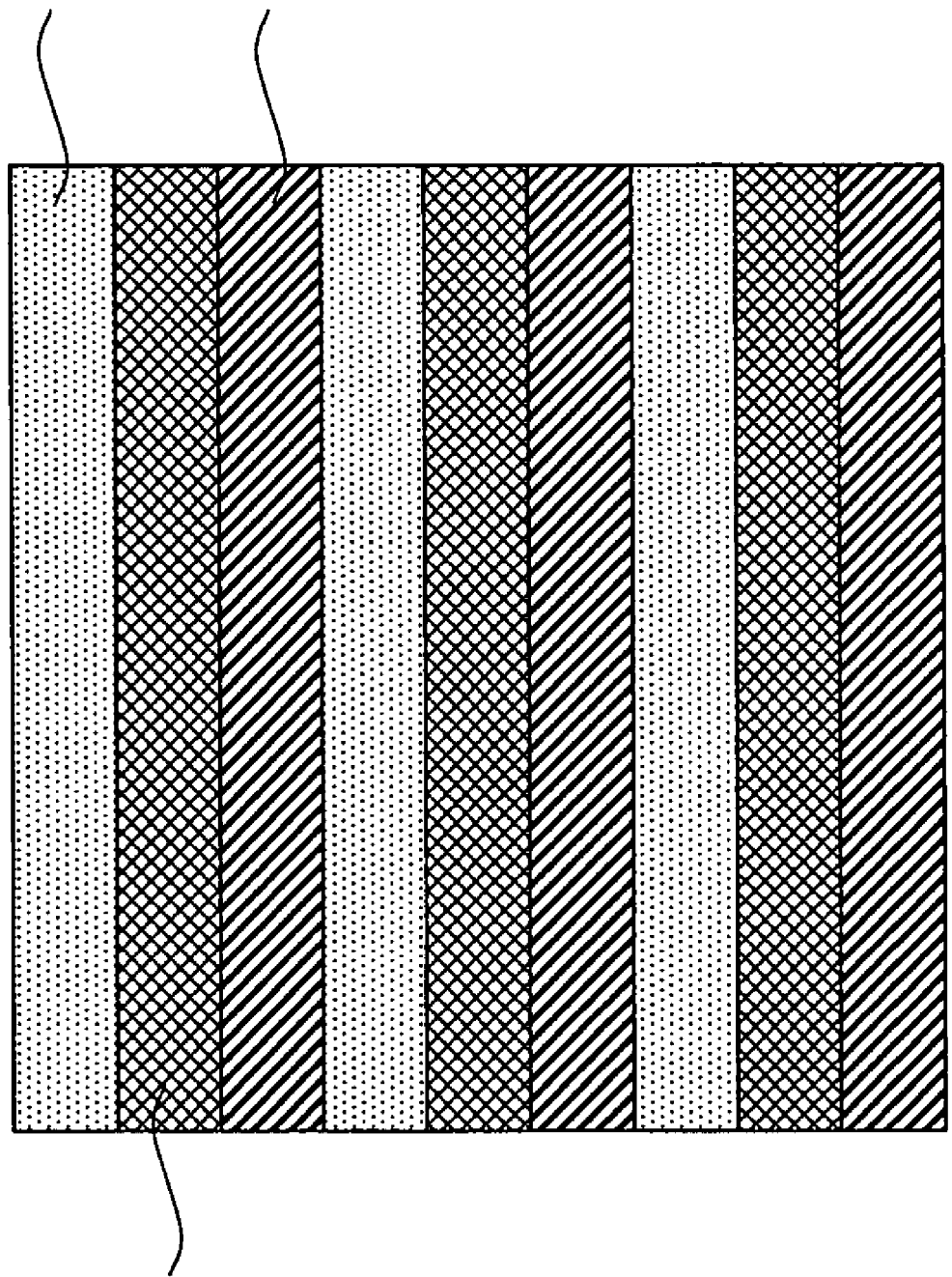
FIG. 16 shows the three-color optical filter (1)
Figure 17:
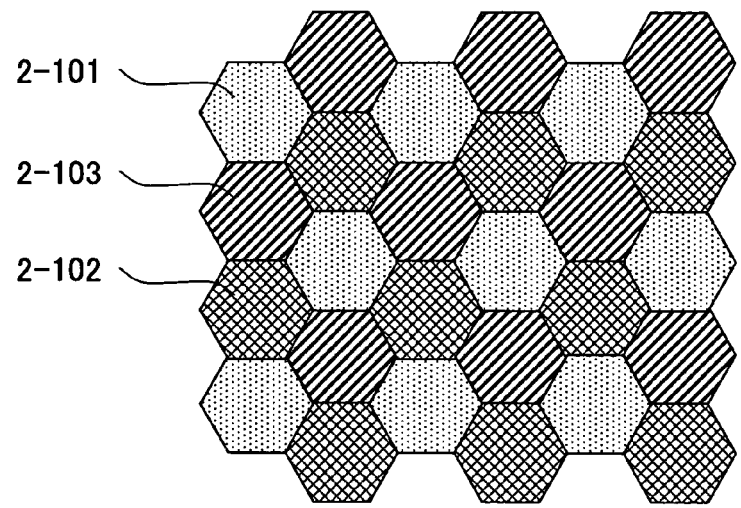
FIG. 17 shows the three-color optical filter (2)
Figure 18:
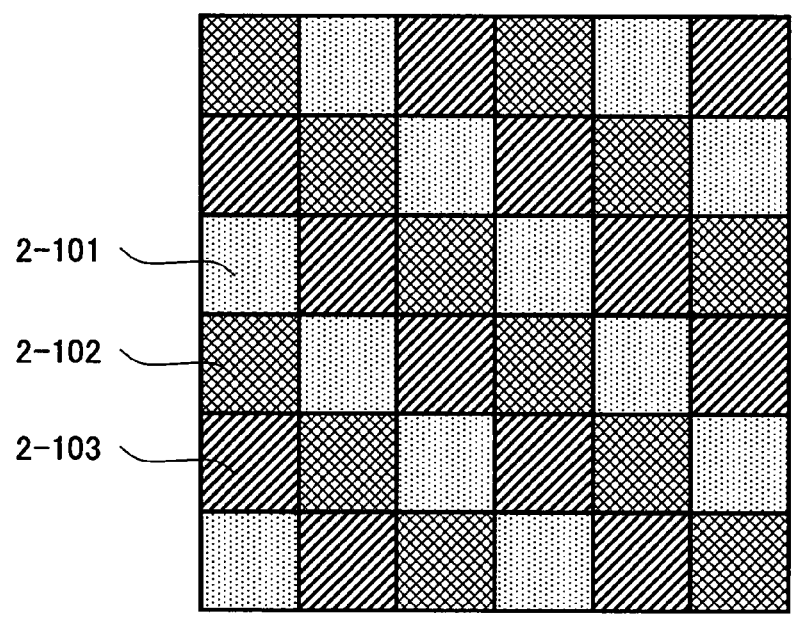
FIG. 18 shows the three-color optical filter (3)

As another embodiment of the optical filter of the present invention, an optical filter having plural optical filter elements provided on a translucent substrate is described. FIGS. 16, 17, and 18 show examples of three-color optical filters. FIG. 16 shows the optical filter (1) in which three colors of striped optical filter elements are periodically arranged. FIG. 17 shows the optical filter (2) in which three colors of hexagonal optical filter elements are two-dimensionally periodically arranged. FIG. 18 shows the optical filter (3) in which three colors of square optical filter elements are two-dimensionally periodically arranged. In these optical filters, an area 2-101 allowing the color of red to pass through has, for example, a structure in which the duty ratio "a" of the optical filter element (1) as shown in FIG. 6 is 1. Similarly, areas 2-102 and 2-103 allowing the colors of green and blue to pass through have structures where the duty ratio "a" is 0.4 and 0.2, respectively.

Repeating the colors of red, green, and blue, for example, in a cycle matching the pitch of an image pick-up device makes it possible to image respective colors with three pixels, thereby allowing for full-color image pick up as a whole. Alternatively, forming the filters of the colors of red, green, and blue in accordance with the pitch of liquid crystal elements makes it possible to display full-color images. In this optical filter, the optical filter elements in the respective areas are different only in the parallel structure. On the other hand, they have the same translucent substrate and the laminated film in their structure. Therefore, first, the laminated film is formed on the whole translucent substrate to obtain a red color filter. Then, a desired parallel structure is formed in required areas of the filter to thereby provide a green color filter element and a blue color filter element. The remaining area of the filter serves as a red color filter element. As described above, the optical filter of this embodiment is the three-color color filter that is very easily manufactured. The optical filters as shown in FIGS. 17 and 18 are different in the shape and arrangement for each optical filter element, but they have the same structure as that shown in FIG. 16. In terms of mixing three colors together, the optical filters as shown in FIGS. 17 and 18 are more preferable.

As still another embodiment of the optical filter of the present invention, there is provided an optical filter having a non-translucent optical filter element. In liquid crystal elements, electrodes and switching transistors are present between pixels, and black resists called black matrices are generally formed to prevent light from entering these parts. In the optical filters as shown in FIGS. 16, 17, and 18, it is also possible for them to have the function of black matrices by forming the structure in which the duty ratio "a" is 0 in the respective transmission areas of the colors red, green, and blue in a size corresponding to the black matrices. Note that a method of manufacturing this optical filter may be almost the same as that of manufacturing the above-described three-color optical filters.

Figure 19:
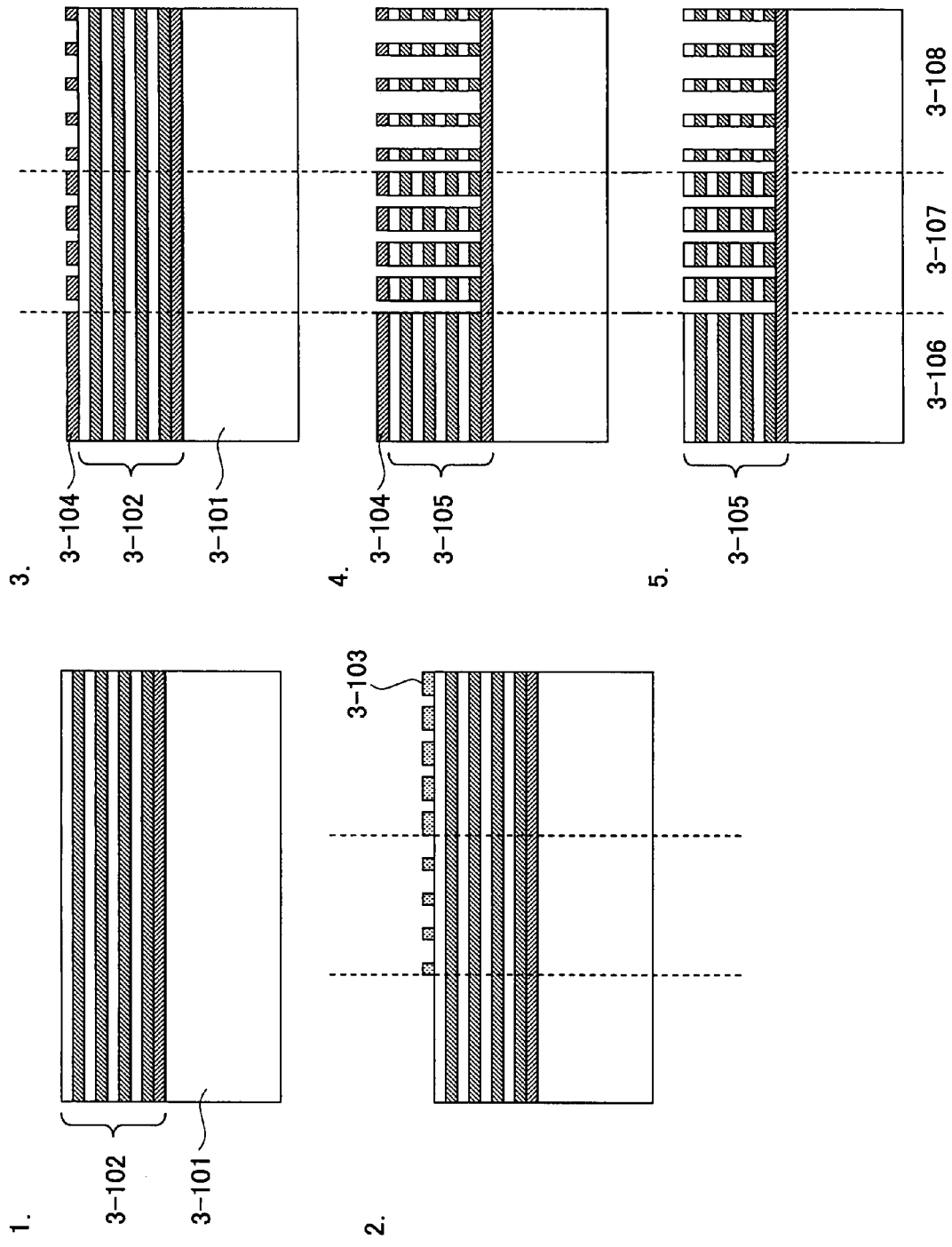
FIG. 19 shows explanatory drawings for manufacturing the three-color optical filter.

Referring next to FIG. 19, a description is made of a method of manufacturing the three-color optical filter (1) as shown in FIG. 16 as an example of manufacturing the optical filters according to the embodiments of the present invention. FIG. 19 schematically shows a structural cross-sectional view of a semifinished product manufactured through respective processes from first to fifth manufacturing processes.

(First Manufacturing Process)

A laminated film 3-102 including a metal film is formed on a translucent substrate 3-101. A thin film can be formed by a physical vapor deposition (PVD) method such as vapor deposition and sputtering, a chemical vapor deposition (CVD) method in which heat or light is applied to a vapor to cause a chemical reaction to thereby form a film on a substrate, or the like. It is also possible to form a film by applying a liquid material by a spin coating method or dipping and then subjecting it to aftertreatment such as baking. Such a film-forming process is repeated plural times to form the laminated film. Moreover, these film-forming methods may be used in combination to form the laminated film. In the first process in FIG. 16, a red optical filter element is formed in the whole area of the film.

(Second Manufacturing Process)

A resist is applied onto the laminated film structure, and then the fine periodic structure is patterned on the resist by a light exposure method to form a resist pattern film 3-103. As the light exposure method, a projection exposing apparatus (known as a so-called stepper) that irradiates a substrate with ultraviolet rays through a mask, an EB exposing apparatus that performs exposure processing by scanning electron beams, an interference exposing apparatus that performs exposure processing by allowing the interference of the light from ultraviolet lasers, or the like can be used. Alternatively, it is also possible to use a method (so-called nano-imprint method) in which a fine transfer mold having been manufactured by such exposing apparatuses is used to be firmly attached to the resist for patterning. The nano-imprint method is more preferable because it allows complicated and fine nano-patterns to be easily transferred. In this process, the pitch "p" and the duty ratio "a" of the gaps in the parallel structures are determined. In the second process in FIG. 19, red, green, and blue optical filter elements are respectively to be formed each in about one-third the area of the laminated film from the left side thereof.

(Third Manufacturing Process)

The resist pattern film 3-103 is subjected to a lift-off process to form a metal pattern film 3-104. In the lift-off process, a metal film is formed on the resist, and then the resist is melted and removed to form a metal film having a pattern reverse to the resist pattern. In the third process in FIG. 19, the metal film is coated on the area of the laminated film to which the etching process is not desired to be applied.

(Fourth Manufacturing Process)

The etching process is performed with the metal pattern film 3-104 formed on the laminated film 3-102 as a mask, and then the laminated film 3-102 is patterned to form a laminated film 3-105 having the fine periodic structure. At this time, it is preferable to use the dry etching process with plasma as the etching process. In the dry etching process, it is possible to perform the etching process with high verticality (anisotropy) depending on plasma conditions. Therefore, the pattern of the metal pattern film 3-104 can be transferred to the laminated film structure with high precision and homogeneity. Furthermore, since the etching rates of Ag, $Ta_2O_5$, and $SiO_2$ are greatly different in the dry etching process, the fine periodic structure is formed only in the thin film composed of $Ta_2O_5$ and $SiO_2$. Although a description is being made using Ag, $Ta_2O_5$, and $SiO_2$ in this manufacturing example, the etching rates of nonmetal materials such as $SiO_2$ and $Ta_2O_5$ and a metal material such as Ag are generally greatly different in many cases when the dry etching process is performed. Accordingly, when nonmetal materials are used for the spacer layer, it is preferable to use a metal for the lower reflection layer as a stopper layer in the dry etching process. With this stopper layer, it is possible to easily form the fine periodic structures and greatly reduce the influence of manufacturing errors due to too much or too little etching time.

(Fifth Manufacturing Process)

This is the last process in which the metal pattern film 3-104 is removed. Since the laminated film 3-105 is desired not to be influenced when the metal pattern film 3-104 is removed, the metal pattern film 3-104 preferably uses a material different from that of the metal film used for the laminated film 3-102. Areas 3-106, 3-107, and 3-108 as shown in the fifth process in FIG. 19 represent a red transmission area 2-101, a green transmission area 2-102, and a blue transmission area 2-103, respectively. When this is viewed from the surface of the optical filter, three colors of optical filter elements are sequentially formed as shown in FIG. 16. FIG. 16 shows a structure in which the units of optical filter elements are further periodically arranged.

In this manner, the optical filter having the configuration as shown in FIG. 16 is manufactured. Since this method uses the laminated film having the same configuration and performs patterning collectively, it is very excellent in productivity. Furthermore, the optical filters (2) and (3) as shown in FIGS. 17 and 18 can also be manufactured in completely the same way just by changing the forming area of the optical filter elements.

The present invention is not limited to the specifically disclosed embodiments, and variations and modifications may be made without departing from the scope of the present invention.

The present application is based on Japanese Priority Patent Application No. 2006-314665, filed on Nov. 21, 2006, the entire contents of which are hereby incorporated by reference.

What is claimed is:

1. An optical filter comprising:
a translucent substrate;
a laminated film formed by laminating plural thin films including a metal film on the translucent substrate;
a parallel structure in which parallel concave-shaped defective parts are periodically provided at a pitch shorter than a transmitted light wavelength, the parallel structure being formed in at least a part of the laminated film;
a first optical filter element; and
a second optical filter element that has the same laminated film as that of the first optical filter element on the translucent substrate common to the first optical filter element; wherein
the second optical filter element has a parallel structure which differs from the first optical filter element in at least either the pitch or a width of the defective parts.

2. The optical filter according to claim 1, wherein an optical filter element having a metal thin film is formed on the translucent substrate.

3. The optical filter in which the optical filter elements according to claim 1 are periodically arranged.

4. The optical filter according to claim 1, wherein three different types of optical filter elements are used, the elements having main transmission wavelength areas that represent colors of red, green, and blue, respectively.

* * * * *